United States Patent
Norton

(10) Patent No.: US 8,761,797 B1
(45) Date of Patent: Jun. 24, 2014

(54) LOCATION ACCURACY BASED ON MAP VIEWPORT

(75) Inventor: Kenneth S. Norton, San Carlos, CA (US)

(73) Assignee: Google Inc., Mountain View, CA (US)

( * ) Notice: Subject to any disclaimer, the term of this patent is extended or adjusted under 35 U.S.C. 154(b) by 11 days.

(21) Appl. No.: 13/396,540

(22) Filed: Feb. 14, 2012

(51) Int. Cl.
*H04W 24/00* (2009.01)
(52) U.S. Cl.
USPC .......... 455/456.2; 455/456.1; 455/456.3; 455/456.4; 455/456.5; 455/456.6; 701/455
(58) Field of Classification Search
USPC ......... 455/456.1–456.6, 457, 404.2; 701/455, 701/462, 532
See application file for complete search history.

(56) References Cited

U.S. PATENT DOCUMENTS

2010/0325194 A1* 12/2010 Williamson et al. .......... 709/203

OTHER PUBLICATIONS

Zhuang, Zhenyun, et al., "Improving Energy Efficiency of Location Sensing on Smartphones", Jun. 18, 2010, MobiSys, San Francisco, California.
Lin, Kaisen, et al., "Energy-Accuracy Aware Localization for Mobile Devices", Jun. 18, 2010, MobiSys, San Francisco, California.
Lin, Kaisen, et al., "Energy-Accuracy Trade-off for Continuous Mobile Device Location", 2010, MobiSys, San Francisco, California.

* cited by examiner

*Primary Examiner* — Wayne Cai
(74) *Attorney, Agent, or Firm* — McDermott Will & Emery LLP

(57) ABSTRACT

The present disclosure provides for varying location accuracy based on a current view of a digital map displayed at a user's mobile device. The displayed digital map includes a visual representation indicating a geographic location of a second mobile device of a second user on the digital map. A network request for an updated geographic location of the second mobile device is initiated based on the determined current map view and the geographic location of the second mobile device relative to the user's device. The network request specifies a degree of location accuracy for the updated geographic location of the second mobile device. The displayed visual representation for the second mobile device in the map view can then be updated based on the updated geographic location of the second mobile device.

18 Claims, 6 Drawing Sheets

LOCATION ACCURACY BASED ON MAP VIEWPORT

BACKGROUND

The present disclosure relates generally to geo-location based services, and, more particularly, to determining geographic locations of users for a geo-location based service.

A geographic location of a device and its user may be derived from global positioning system (GPS) coordinates if the device is equipped with a GPS receiver. Alternatively, the location may be determined from a network address assigned to the device by a network communications service provider for cellular or wireless Internet (e.g., WiFi) data connections. GPS is relatively more accurate, but also may be battery intensive, slow and unusable indoors or in deep urban canyons. Network locations derived from cellular or wireless Internet connections are generally less battery intensive, but also less accurate in comparison with GPS.

SUMMARY

The disclosed subject matter relates to varying location accuracy when updating a location of a computing device being represented on a digital map based on a current view of the digital map. In an example method, a current map view of a digital map being displayed at a mobile device of a first user is determined. The displayed digital map includes a visual representation indicating a geographic location of a mobile device of a second user on the digital map. A current geographic location of the first user's mobile device. A network request for an updated geographic location of the second user's mobile device is initiated, based on the determined current map view and the determined current geographic location of the first user's mobile device relative to the geographic location of the second user's mobile device. The network request also specifies a degree of location accuracy for the updated geographic location of the second user's mobile device. Upon receiving the updated geographic location of the second user's mobile device as requested previously, the displayed visual representation for the second mobile device in the map view is updated accordingly.

The disclosed subject matter further relates to a machine-readable medium comprising instructions stored therein, which when executed by a processor, causes the processor to perform operations comprising: determining a current map view of a digital map being displayed at a first mobile device of a first user, where the displayed digital map includes a visual representation indicating a geographic location of a second mobile device of a second user on the digital map; determining a current geographic location of the first mobile device; determining an accuracy radius for an updated geographic location of the second mobile device based on the determined current map view and the determined current geographic location of the first mobile device relative to the geographic location of the second mobile device, where the accuracy radius defines a degree of location accuracy for the updated geographic location of the second mobile device; initiating a network request for the updated geographic location of the second mobile device based on the determined accuracy radius; and updating the displayed visual representation for the second mobile device in the map view based on the updated geographic location of the second mobile device.

The disclosed subject matter also relates to a system including a map viewer and a location manager. The map viewer is configured to display a digital map according to a current map view at a first mobile device of a first user. The displayed digital map includes a visual representation indicating a geographic location of a second mobile device of a second user on the digital map. The map viewer is also configured to update the displayed visual representation for the second mobile device in the map view based on an updated geographic location of the second mobile device. The location manager is configured to determine a current geographic location of the first mobile device in addition to an accuracy radius for the updated geographic location of the second mobile device. The accuracy radius is determined based on the current map view of the map displayed by the map viewer and the determined current geographic location of the first mobile device relative to the geographic location of the second mobile device. The location manager also may be configured to vary a degree of location accuracy, as defined by the accuracy radius, for the updated geographic location of the second mobile device based on the portion of the digital map being displayed within the current map view at the first mobile device. Additionally, the location manager may initiate a network request for the updated geographic location of the second mobile device based on the determined accuracy radius. The network request may specify the degree of location accuracy for the updated geographic location of the second mobile device and the updated geographic location of the second mobile device may be requested on a periodic basis according to a predetermined location update frequency. The predetermined location update frequency may be adjusted based on the proximity of the second mobile device's location relative to the current geographic location of the first mobile device It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The disclosed subject matter relates to varying location accuracy when updating a location of a computing device being represented on a digital map based on a current view of the digital map. The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Figure 1:
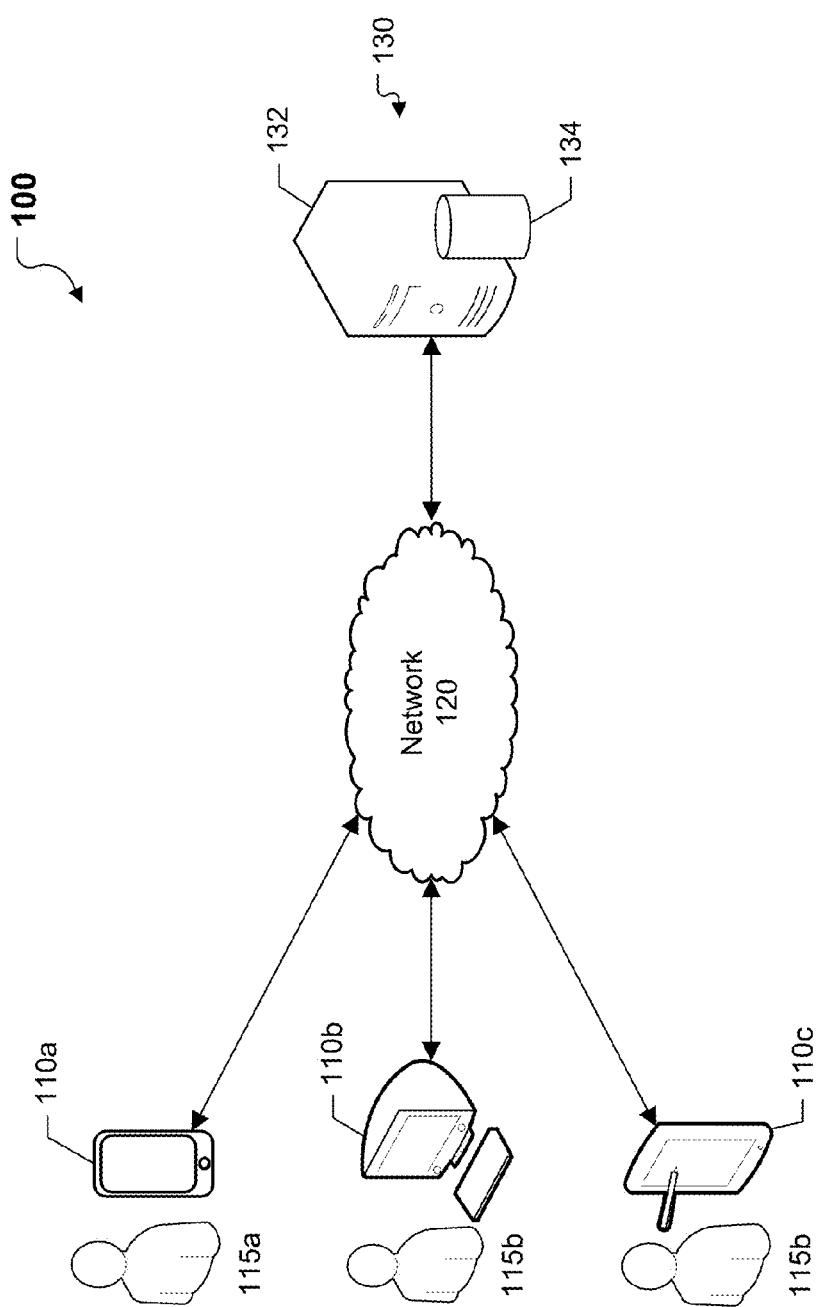
FIG. 1 is a diagram of an example network environment suitable for practicing an implementation of the subject technology.

FIG. 1 illustrates an example network environment 100 suitable for practicing an implementation of the subject technology. Network environment 100 includes computing devices 110a, 110b and 110c (hereinafter "devices 110a-c"), and a computing system 130. Devices 110a-c communicate with one or more servers 132 of computing system 130, for example, through network 120. As shown in FIG. 1, computing system 130 includes at least one server device 132 and at least one computer-readable storage device or database 134. Although only server 132 and database 134 are shown in FIG. 1, additional servers and/or databases may be used as may be necessary or desired for a particular implementation. Further, server(s) 132 are communicatively coupled to database(s) 134. Database 134 may store any type of data accessible by server(s) 132. As will be described in further detail below, database 134 may be used to store location data provided to computing system 130 by each of devices 110a-c.

Devices 110a-c can be any type of computing device with at least one processor, local memory, display, and one or more input devices (e.g., a mouse, QWERTY keyboard, touchscreen, microphone, or a T9 keyboard). Examples of different computing devices that may be used to implement any of devices 110a-c include, but are not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Alternatively, each of devices 110a-c can be a specialized computing device such as, for example, a mobile handset or tablet computer. Similarly, server 132 can be implemented using any general-purpose computer capable of serving data to any of devices 110a-c. Examples of computing devices that may be used to implement server 132 include, but are not limited to, a web server, an application server, a proxy server, a network server, or a group of computing devices in a server farm.

In some aspects, each of the computing devices 110a-c may communicate wirelessly through a communication interface (not shown), which may include digital signal processing circuitry where necessary. The communication interface may provide for communications under various modes or protocols, e.g., Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, e.g., using a Bluetooth, WiFi, or other such transceiver.

In some aspects, network environment 100 can be a distributed client/server system that spans one or more networks such as network 120. Network 120 can be any network or combination of networks that can carry data communication. Such a network can include, but is not limited to, a cellular network, a local area network, medium area network, and/or wide area network such as the Internet, or a combination thereof for communicatively coupling any number of mobile clients, fixed clients, and servers. In some aspects, each of devices 110a-c can communicate with server 132 via a virtual private network (VPN), Secure Shell (SSH) tunnel, or other secure network connection. In some aspects, network 120 may further include a corporate network (e.g., intranet) and one or more wireless access points.

In an example, each of devices 110a-c may be configured to execute a client application that can provide various location based services to users 115a, 115b and 115c, respectively. Devices 110a-c each may execute a different implementation of the client application depending on the type or computing platform of the respective device. For example, the client application may be implemented as a location based application for a mobile device platform (e.g., at device 110a or 110c) or for a desktop computer platform (e.g., at device 110b). Such a location based client application can be any type of application capable of sending and receiving information, including location information, via network 120 to and from other devices or similar location based applications executing thereon. In some implementations, the location based application may be a social networking application that enables each of users 115a-c to share their respective geographic location (or the location of their respective devices 110a-c) amongst one another via network 120.

The location information used to determine the geographic location of each of devices 110a-c may be derived from various sources including, but not limited to, GPS (e.g., providing latitude/longitude coordinates of a geographic location), cell towers in a cellular or mobile communications network or WiFi access points. For example, devices 110a-c may each include one or more network interface device(s) for enabling cellular and/or wireless Internet (WiFi) data communications. Thus, any of devices 110a-c or computing system 130 can lookup an identifier of a cellular antenna or WiFi transmitter in a database that correlates identifiers to locations. In another example, time difference of arrival data can be used to perform a multilateration operation to determine a location for a computing device. WiFi signal strength also can be used to refine a location of a computing device (e.g., the signal strength may be proportional to a distance between the computing device and the WiFi transmitter, or a particular pattern of signal strengths may indicate a particular location). Additionally or alternatively, one or more of devices 110a-c may include a GPS receiver for receiving geo-positioning information from one or more GPS systems. Thus, location data reported for a device (e.g., device 110a) may include GPS coordinates registered by a GPS receiver of the device or a geographic location derived from a network location provider (e.g., a wireless communication service provider).

Computing system 130 can be used to facilitate the reporting or sharing of location data between devices 110a-c via network 120. The location data being shared may correspond to, for example, the locations of participants in a location sharing event (e.g., a scheduled meeting or other social event) arranged by users (e.g., users 115a-c) of the social networking application or service. As noted above, location data may be reported by devices 110a-c to computing system 130 over network 120. The reported location data may be stored at, for example, database 134. In an example, computing system 130 (e.g., server 132) may share location data (e.g., stored in database 134) for a particular device (e.g., device 110c) in response to a request for the location of the device or its associated user (e.g., user 115c) from a different device (e.g., device 110a). The location being shared for device 110c in this example may be a current geographic location being reported by the device itself (e.g., performing a background location reporting operation) via network 120 in response to the request from device 110a. For example, the social networking application executing at device 110a may utilize computing system 130 to direct device 110c (e.g., which may also be executing the same or similar social networking application) to report its geographic location. Alternatively, the location of device 110c being shared by computing system 130 with device 110a may be a last-known or best available location associated with device 110c (e.g., as stored in database 134).

As will be described in further detail below with respect to FIGS. 3A and 3B, the social networking application may include a map viewer enabling each of users 115a-c to view the particular user's current geographic location and the relative geographic locations of other users (or their devices) as represented on a digital map displayed in the map viewer. In some implementations, the location accuracy associated with the location of the user's friend (or of the friend's device) is increased or decreased based on the currently displayed map viewport and the relative proximity of the user's current location to the friend's location. Accordingly, the user's (or map viewer's) current location and map viewport can be used as "hints" to infer an appropriate or desired location accuracy for the user based on the user's prospective needs with respect to the location based application as indicated by its current usage.

Figure 2:
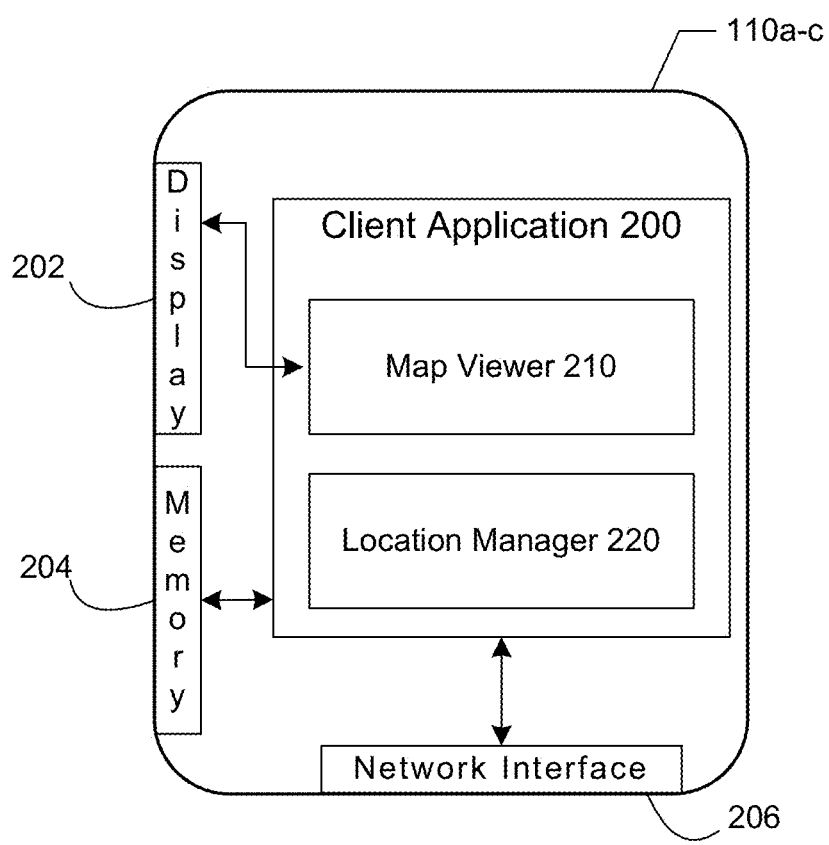
FIG. 2 illustrates an example user device including a client application with a map viewer in which geo-location accuracy may be varied based in part on a current view of the map and a current geographic location of the device.

FIG. 2 is a functional block diagram showing portions of a computing device representing any of computing devices 110a-c (hereinafter "device 110a-c") of network environment 100 of FIG. 1, as described above. For example, device 110a-c may be either a mobile device (e.g., implemented using device 110a or device 110c) or a desktop computing device (e.g., device 110b), as described above. As shown in the example of FIG. 2, a client application 200 includes a map viewer 210 and a location manager 220. In addition to client application 200, device 110a-c includes a display 202, a memory 204 and a network interface 206. Although not shown in FIG. 2, device 110a-c may include additional components for implementing the subject technology, as described herein. These other components and data are not shown in FIG. 2 for ease of explanation and purposes of discussion. Further, client application 200 and its components, including map viewer 210 and location manager 220, are described using network environment 100 of FIG. 1 by way of example, but are not intended to be limited thereto.

Client application 200 may be implemented as, for example, a web application executable within a web browser executing at device 110a-c. In this example, the client application 200 may be configured to display a map and information corresponding to the geographic location of different users via one or more web pages using various browser-supported programming languages including, but not limited to, JavaScript, VBScript, HTML, or other type of language for writing web pages. Accordingly, map viewer 210 may be, for example, embedded within a web page in a content area of the web browser as it is displayed to a user via display 202. However, client application 200 is not intended to be limited to web browsers and may be implemented using a standalone location based application.

As described above, client application 200 may provide location based services associated with a social networking website or service for the user of device 110a-c. For example, client application 200 and map viewer 210 may be integrated with a map service for displaying the locations of different social connections of the user's social network. These social connections may be represented in a social graph associated with the user in the social networking application or service. In an example, location manager 220 may be used to perform a background location reporting operation that configures the device 110a-c to report location information to another device over the network, as described above. The other device may correspond to, for example, the user's friend or other social connection, as described above. In this example, the user of device 110a-c (e.g., any of users 115a-c of FIG. 1) may have previously authorized automatic location sharing for client application 200 (e.g., via a user option in a preference setting of device 110a-c), thereby enabling the background reporting operation to be performed automatically, without requiring any separate authorization from the user.

In addition to reporting location information to other devices, client application 200 also may request the location of other devices (e.g., which may also be executing the same or similar type of social networking application as client application 200). The locations may be displayed by map viewer 210 to the user via display 202 in association with different views of a particular geographic area of interest on a digital map. The digital map may be displayed via display 202, for example, as a viewport into a grid of map tiles. The map tiles along with other configuration information for displaying the map and map features may be received at device 110a-c from the map service via network interface 206. Further, the received map tiles and configuration information may be stored at memory 204 or other data store accessible to device 110a-c. As will be described in further detail below, the map viewport may be displayed with a graphical user interface (GUI) including various user interface controls that enable the user or viewer of the map to adjust viewport parameters so as to change the view of map being displayed on display 202.

Figure 3A:
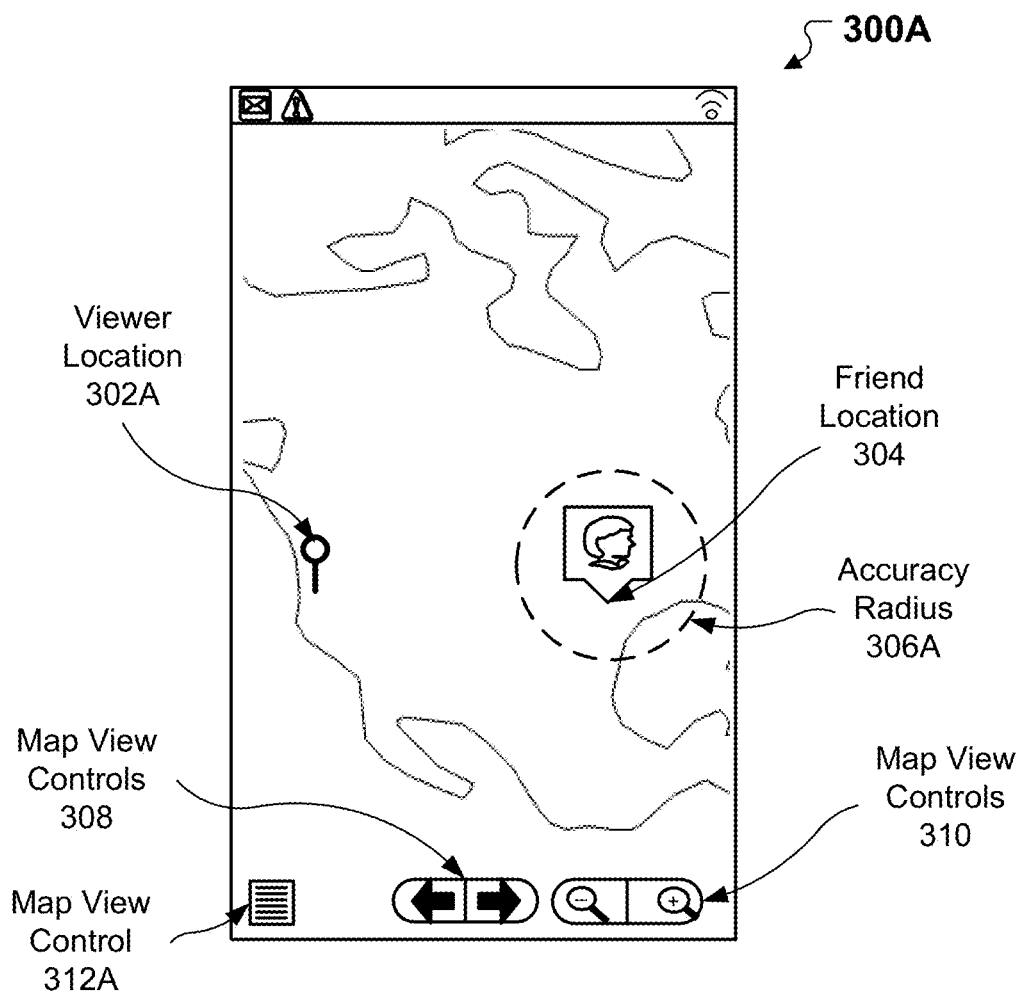
FIG. 3A illustrates an example graphical user interface of a client application in which user location accuracy may be varied based on a view of the map within the application.

FIG. 3A illustrates an example GUI 300A of a client application (e.g., client application 200 of FIG. 2, as described above). The example GUI 300A as shown in FIG. 3A may be implemented for a mobile client application executable at a mobile device of a user. However, the techniques described with respect to GUI 300A are not intended to be limited to mobile applications or mobile devices and thus, may be implemented using any type of computing device (e.g., desktop computer). The mobile device user may be a user of a social networking service. As shown in FIG. 3A, GUI 300A includes a map viewport displaying a portion of a digital map corresponding to a geographic area or region of interest to the user. In addition, GUI 300A includes visual markers for a viewer location 302A and a friend location 304. The visual marker for viewer location 302A corresponds to a determined geographic location of the map viewer (e.g., the user of the device) and the marker for friend location 304 corresponds to the determined location of the user's friend or social connection. The viewer location 302A and friend location 304 may be determined from various sources (e.g., GPS, Cell-ID or WiFi), as described above.

Also, as shown in FIG. 3A, GUI 300A includes map view controls 308 for enabling the user to manipulate the position and orientation of the map viewport so as to view different geographic points or areas of interests. GUI 300A may further include map view controls 310 for varying a height level of the map viewport, thereby increasing or decreasing a zoom level at which portions of the digital map are displayed in the viewport. In an example, a default view (e.g., including a default position, orientation and zoom level) of the map may be displayed via GUI 300A upon the user's initial launch of the client application at the user's device. The default view of the map may be adjusted as desired by the user using map view controls 310. For example, the user's manipulation of map view controls 308 or 310 may cause one or more viewport parameters to be adjusted so as to change the position, orientation or height/zoom level of the portion of the map as displayed on the user's device via GUI 300A. GUI 300A also may include an additional map view control 312A for enabling the user to perform additional operations with respect to the displayed map viewport. In an example, the user may use map view control 312A to select one or more other users of the client application or the social networking service whose locations (or the locations of their respective devices) may be within the portion of the map being displayed currently within the viewport. The list of users may be displayed to the user via GUI 300A within, for example, a separate screen or window (e.g., a pop-up dialog). In a different example (e.g., as shown by map view control 312B of FIG. 3B, discussed further below), the additional operations may include searching and viewing visual representations indicating the geographic locations of various points of interest including, for example, various landmarks, buildings or other map features.

In addition to the various map view controls of GUI 300A and 300B, as described above, other types of user input may be supported that enable able the user to interact with each of GUI 300A and 300B and perform similar operations including operations to manipulate the map viewport (e.g., change the position, orientation or zoom level) in other ways. For example, GUI 300A and 300B may be implemented using a mobile device having a touch-screen user input device. As such, the user may be able to change map viewport parameters and perform other operations using various finger gestures via the touch-screen interface, as supported by the particular device and GUI implementation.

As shown in FIG. 3A, a geo-location accuracy radius 306A associated with the user's friend location 304 may be varied based in part on a current view of the map being displayed. The accuracy radius 306A may define a degree of location accuracy associated with friend location 304. For example, a larger accuracy radius may cover a larger geographic region and thus, is less precise than a smaller accuracy radius that covers a relatively smaller region. Further, this accuracy radius may be a function of the source or type of the location data used to determine the location in question. As noted above, geographic location information from the GPS is relatively more accurate, but generally requires more power to operate and thus reduces battery life. In addition, GPS typically suffers from slow performance and since it relies on line-of-sight communication with a GPS satellite, it may be unusable altogether in certain situations (e.g., when the user and device 110a-c is indoors or in a deep urban canyon with very little to no line-of-sight to a GPS satellite). On the other hand, while network locations based on cellular or wireless network connections are less battery intensive, they generally are much less accurate than GPS and thus, may have a much larger accuracy radius.

For example, an accuracy radius corresponding to a range of geographic locations for the friend's location may be made more precise (e.g., made smaller to cover a limited range of locations) or less precise (e.g., made larger to cover a wider range of locations) based on whether the current map viewport is being displayed at a relatively high zoom level (e.g., map is viewed at a lower height or distance relative to the ground) or at a low zoom level (e.g., map viewed at a greater height or distance from ground level), respectively. As shown in FIG. 3A, the map viewport of GUI 300A is displayed at a relatively low zoom level corresponding to a large geographic area (e.g., covering a continent or country). In contrast with the map viewport shown in GUI 300A, the example GUI 300B of FIG. 3B shows a different view of the map at a higher zoom level (or lower height relative to the ground). The relatively high zoom or height level at which the map viewport being displayed via GUI 300B may correspond to, for example, a relatively smaller geographic area covering a few city blocks whereas a low zoom level may correspond.

As such, the map viewport displayed in GUI 300B may represent the same map as displayed in GUI 300A after the user has used map viewport controls 310 to view the map and the current position of the friend on the map at a high zoom level (e.g., to display a "zoomed-in" view of the map). For example, the user may be interested in viewing the location of a friend who is in close proximity because the user may have a meeting engagement with the friend and therefore, would like to know the friend's current location for timing purposes. Additionally, the user's device (e.g., device 110a-c of FIGS. 1 and 2, described above) may include other types of sensors including, for example and without limitation, an accelerometer for detecting motion or a barometer for detecting elevation. For example, the user's device may use information provided by an accelerometer to detect motion (e.g., at the user's device or at the friend's device) in determining the location of the friend's device. Further, if the friend's location is determined to be nearby, a network request initiated from the user's device may cause the friend device to keep its GPS powered on or in an active state as motion may indicate that the user/map viewer and friend are on their way to meet up with each other. Similarly, elevation information provided a barometer of the friend's device can be used to determine on which floor of a building having multiple floors (e.g., a skyscraper) the friend may be located currently. This may be useful, for example, with respect to an indoor positioning capability that may be integrated with the map service or map viewer (e.g., map viewer 210 of FIG. 2) implemented in the social networking application.

Figure 3B:
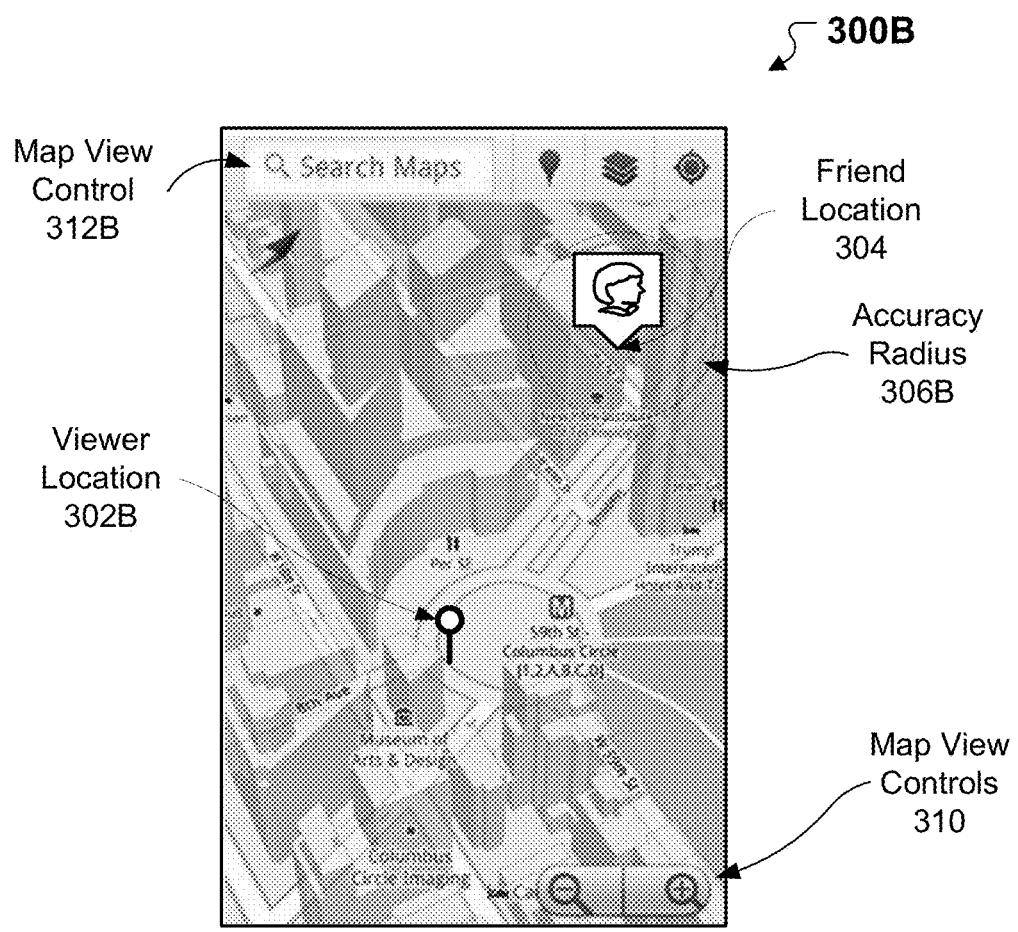
FIG. 3B illustrates the example graphical user interface of FIG. 3A in which user location accuracy may be varied based on a different view of the map within the application.

Although not shown in FIG. 3A or 3B, the client application executing at the user's device may include additional interfaces for using other types of functionality (e.g., associated with a social networking application or service) provided by the client application, which may be used in combination with the map interface of GUI 300A or 300B, as described herein. In an example, the client application may include an interface for scheduling a location sharing event (e.g., a meeting arranged as a calendar event). Such an interface may include various user interface controls enabling the user to configure various parameters for scheduling such an event. Examples of such parameters may include, but are not limited to, a title, a place for the event, a calendar with which the event is associated, a description, a color for displaying the event, reminders for the event, and an availability status.

Referring back to FIG. 2, location manager 220 may be configured to adjust the accuracy radius for the location of the user's friend (e.g., friend location 304 of FIGS. 3A and 3B) based on the current map viewport (e.g., as configured by the user using map view controls 310) and one or more other factors. Examples of such other factors may include, but are not limited to, the current geographic location of the user viewing the map (e.g., map viewer location 302A or 302B) or the user's device at which the location based application is executing, the proximity or relative geographic location of another user's device (e.g., friend location 304) relative to the map viewer's current location, and whether or not the map viewer or the other user is currently in motion (e.g., based on input received from an accelerometer of their respective devices). To further optimize battery utilization, location manager 220 may use any one of various threshold limitations may be introduced to restrict, for example, the number of friend locations being tracked, the time of day for tracking these locations, and perhaps even the particular geographic area(s) of interest for which these locations are to be tracked.

Location manager 220 may use various techniques to adjust (e.g., increase) location accuracy based on the current map viewport and such other factors, as noted above. In some implementations, location manager 220 may be configured to increase a location update frequency or time interval. For example, the locations of the user and the user's friend may correspond to the locations of their respective mobile devices, and thus, the initially reported locations may vary over time. Accordingly, location manager 220 may be configured to determine or update the geographic location of the friend's location relative to that of the user's on a periodic basis or predetermined time interval in order to improve the accuracy and relevancy of the available location data. Similarly, location manager 220 may be configured to report the location of the device 110*a-c* to other devices over the network on a periodic basis. Such an operation may require location manager 220 to initiate or perform frequent real-time location updates, e.g., for either reporting the location of device 110*a-c* or requesting the location of other user devices, as described above. Consequently, any periodic background location reporting performed by location manager 220 will attempt to maintain a balance between location accuracy, data freshness and power consumption, automatically and without any further intervention from the user.

Using the example shown in FIG. 3B, as described above, upon determining from the current map viewport that friend location 304 is in close proximity to the user's current location (map viewer location 302B), location manager 220 may initiate a network request directing the friend's device (e.g., friend's mobile device) or another computing system (e.g., computing system 130 of FIG. 1, as described above) to report its location on a continuous basis in real time. Thus, location manager 220 can increase the location accuracy to obtain a more precise accuracy radius 306B for friend location 304. In the example shown in FIG. 3A, the user/map viewer location 302A may be determined by location manager 220 to be located at a relatively great distance from the determined friend location 304. Thus, it may not be necessary for the friend's device to report a precise location for friend location 304 and the precision of the accuracy radius 306A and update frequency may be reduced accordingly. However, if the user in the example of FIG. 3B were to decrease the zoom level (e.g., using map view controls 310) such that the map is displayed by map viewer 210 as a map viewport at a low zoom level (e.g., as shown in FIG. 3A), location manager 220 may then reduce the location accuracy (e.g., by decreasing the update frequency). In this example, a lower zoom level may indicate that a precise location accuracy may not be necessary for viewing the friend's location, regardless of whether the user's current location is in close physical proximity to the friend's location.

Another example of a technique that can be used by location manager 220 to improve location accuracy is to request a more accurate location measurement, depending on the best or most accurate type of measurement available, from the mobile device of the friend. For example, it may be determined by location manager 220 that the available location data may have been based on the location of a cellular tower or a WiFi access point. Assuming the friend has voluntarily agreed to share his location for the above-described location application, if the friend's device is equipped with a GPS receiver and the GPS functionality is enabled, the user's device may initiate a location request to cause the friend's device to invoke the GPS receiver and send an updated location including GPS coordinates. As described above, in addition to GPS, location manager 220 may adjust location accuracy based on information obtained from various other sensors communicatively coupled to either the user's device, the friend's device or both devices. Examples of such other sensors that may be utilized in adjusting location accuracy may include, but are not limited to, an accelerometer to detect motion (e.g., at the user's device or at the friend's device) or a barometer to detect elevation. Data from such sensors may be used in combination with the map viewport (and other factors described above) as additional "hints" or indications of the user's needs or preferences with respect to the client application 200 as it is being used currently by the user. Accordingly, user experience may be improved, as the client application 200 is able to better meet the user's desired location freshness and accuracy while also optimizing for battery utilization.

Figure 4:
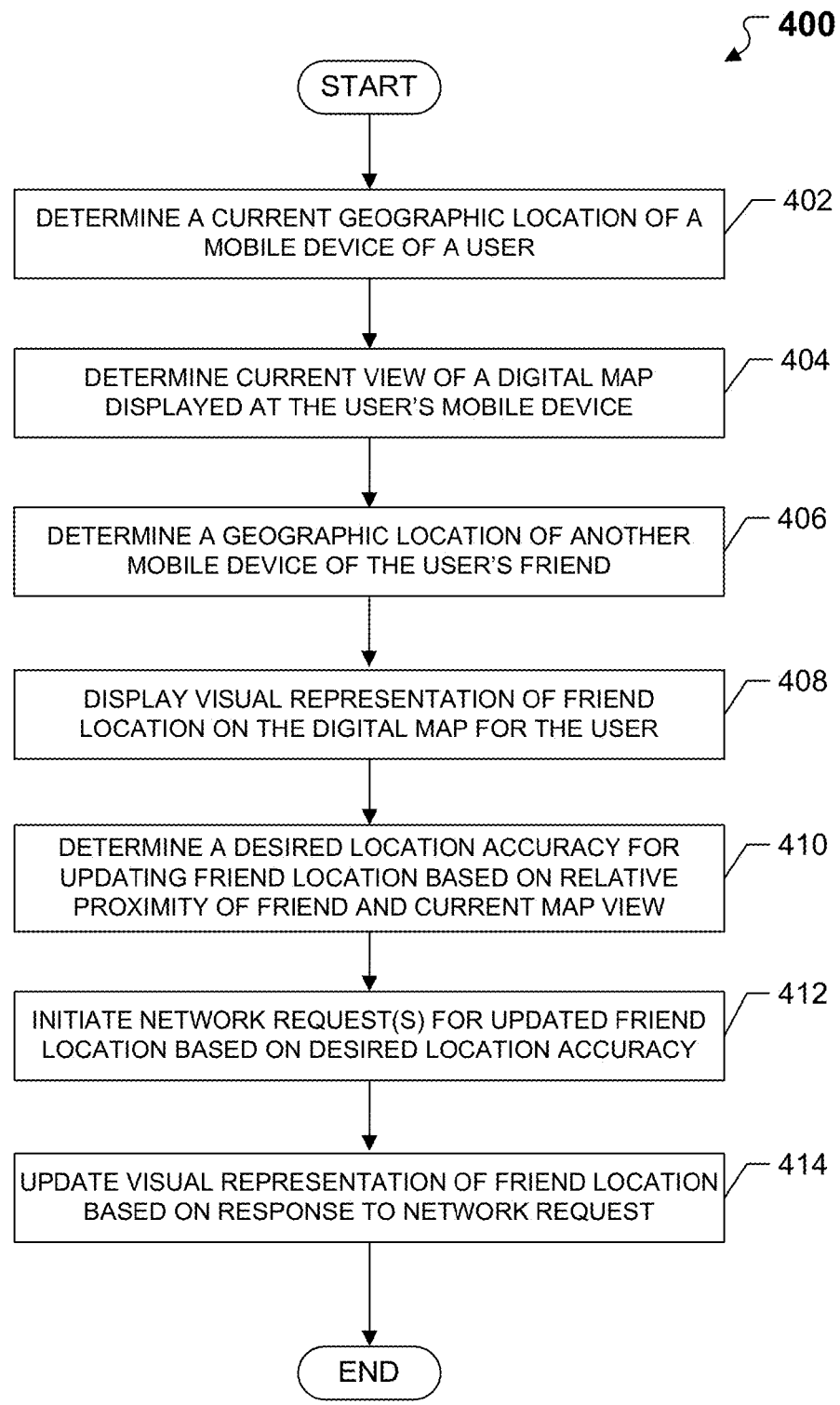
FIG. 4 is a process flow chart of an example method for varying location accuracy based in part on a current map view and a current geographic location of a user.

FIG. 4 is a process flow chart of an example method 400 for varying location accuracy based in part on a current map view and a current geographic location of a user. For ease of explanation, method 400 will be described using network environment 100 of FIG. 1 and client application 200 of FIG. 2, as described above. However, method 400 is not intended to be limited thereto.

Method 400 begins in step 402, which includes determining a current geographic location of a mobile device of a user. For example, the user may be a user of a social networking application or service. The social networking application may be a client application (e.g., client application 200 of FIG. 2, as described above) executable at the user's mobile device. Users of the social networking application may be able to share location information in various ways including, but are not limited to, sharing a GPS track or record of geographic locations previously traveled during a predetermined period of time, by sharing a geo-tagged image, or by using a "check-in" feature of the social networking application that automatically reports the current location of one user to one or more of the user's friends, other social connections or other general users of the social networking application (e.g., who have expressly consented to sharing or receiving such location information). As described above, the current geographic location of the user's device may be determined using location information derived from various sources. In an example, the user's device may be equipped with a GPS device and thus, the location information may be derived from a GPS system or a wireless communication network provider for cellular or wireless Internet (e.g., WiFi) connections. While method 400 is described in the context of a mobile device, method 400 is not intended to be limited thereto, and the steps of method 400 may be performed using a desktop computing device.

Method 400 then proceeds to step 404, which includes determining a current map view of a digital map being displayed at the user's mobile device. In some implementations, the social networking application may be integrated with a map service for displaying different views of a particular geographic area of interest on a digital map. For example, the digital map may be displayed on a display screen of the user's device as a viewport into a grid of map tiles. In addition, the viewport may be displayed with a graphical user interface including various user interface controls that enable the user or viewer of the map to adjust viewport parameters so as to change the displayed map on the user's device. Examples of such user interface controls may include, but are not limited to, controls to change the position and orientation of the displayed digital map in the viewport in addition to controls for changing increasing or decreasing a zoom level at which the map view is displayed.

In step 406, a current geographic location of a second user's mobile device is determined. The second user may be a friend or other social connection associated with the user in the social networking application or service, as described above. Like the geographic location of the user's device as determined in step 402, the location of the friend's device may be determined using location information from various sources including, but not limited to, GPS, cell towers and WiFi access points. Further, like the social networking application executing at the user's device, the same or similar application may be executing at the friend's device. The social networking application executing at each device (or at another computing device in the network, as described previously) may configure each user's device to perform a background location reporting operation for reporting (e.g., in real-time) the location information from one device to the other over the network.

Method 400 proceeds to step 408, in which a visual representation indicating the geographic location of the friend's device is displayed on the digital map. Based on the current view of the map and the current geographic location of the user's device as determined in step 402, another visual representation indicating the user's location may also be displayed on the digital map. Further, the current map view and the relative proximity of the friend's device location with respect to the user's current location are used in step 410 to determine a desired location accuracy for updating the friend's location. For example, the degree of location accuracy corresponding to the friend's location in part may be a function of how often the background location reporting operation is performed for the friend's mobile device. Such background location reporting frequency also may be based on the number of network requests for location updates received by the friend's device. Thus, in step 412, one or more network requests for updated geographic location data for the friend's mobile device may be initiated based on the determined location accuracy in step 410 (e.g., from the current map view and the determined current geographic location of the user's mobile device relative to the geographic location of the friend's mobile device). Upon receiving an updated geographic location of the friend's mobile device based on the initiated network request, method 400 proceeds to step 414 in which the displayed visual representation indicating the friend's location within the map view is updated accordingly.

As described above, increasing the frequency or time interval at which the friend's location is reported may help to improve the accuracy and relevancy of the available location data. In an example, if the friend is determined to be in close proximity to the user's current location, a request may be sent to the friend's device that causes the device to report location on a continuous basis in real time. However, in a different example, the user may be located at a relatively great distance from the determined location of the friend (or friend's mobile device) even though the current map view is displayed at the user's device at a high level of zoom. Thus, it may not be necessary for the friend's device to report a precise location and the accuracy radius and update frequency may be reduced accordingly.

Also, as described above, another way to modify the initiated request to obtain a higher degree of desired location accuracy is to request a more accurate location measurement, depending on the best or most accurate type of measurement available, from the mobile device of the friend. For example, it may be determined that the available location data may have been based on the location of a cellular tower or a WiFi access point. Assuming the friend has voluntarily agreed to share his location for the above-described location application, if the friend's device is equipped with a GPS receiver and the GPS functionality is enabled, the user's device may initiate a location request to cause the friend's device to invoke the GPS receiver and send an updated location including GPS coordinates. In this way, the user's or viewer's current location and maps viewport can be used as "hints" to infer the user's desired location accuracy.

Benefits of method 400 may include, but are not limited to, improving user experience by inferring the user's desired location freshness and accuracy while also optimizing for battery utilization, and enabling a mobile computing device to reduce power consumption by controlling the level of location accuracy based on the current map view and the user's (or device's) current location. To further optimize battery utilization, any one of various threshold limitations may be introduced to restrict, for example, the number of friend locations being tracked, the time of day for tracking these locations, and perhaps even the particular geographic area(s) of interest for which these locations are to be tracked.

Figure 5:
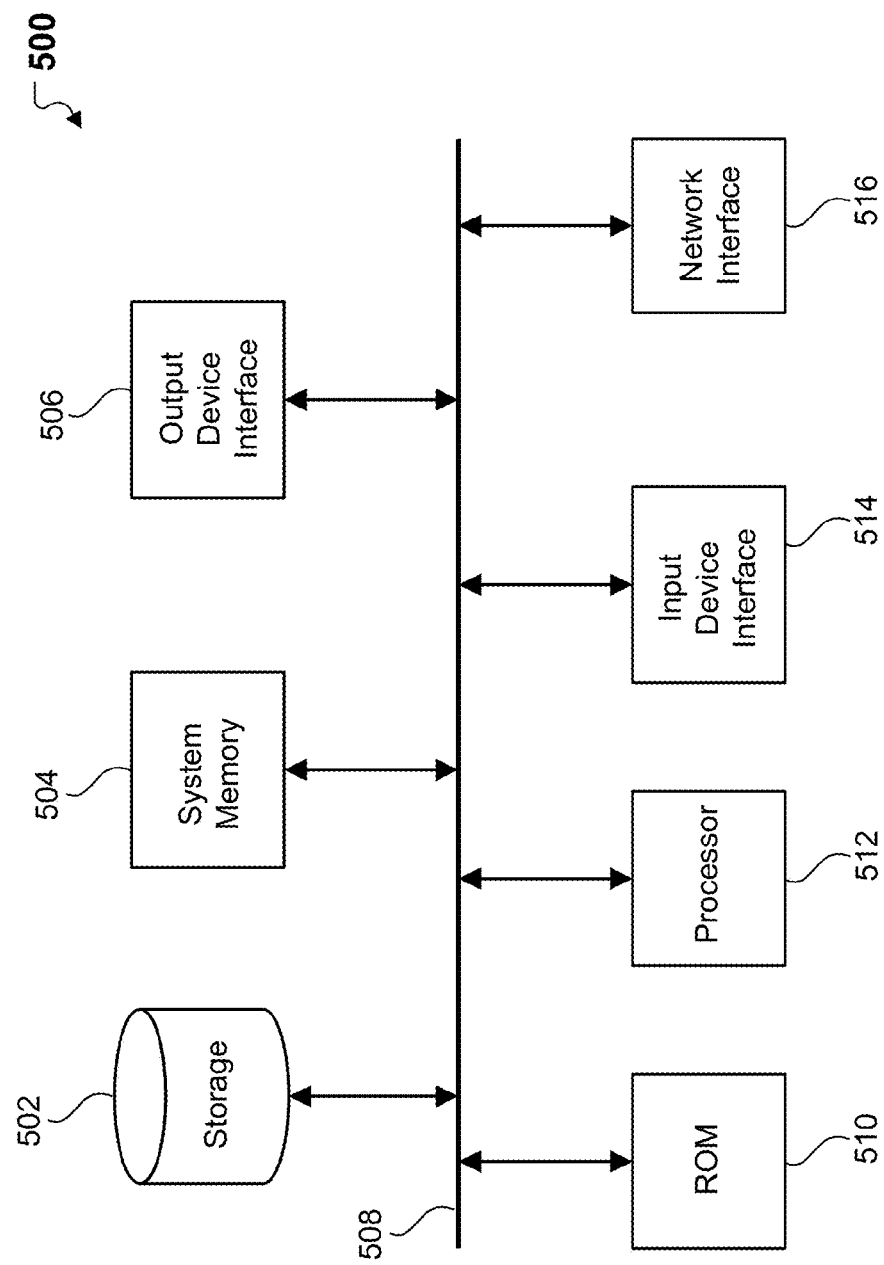
FIG. 5 is a diagram of an example computer system in which some of the subject technology may be implemented.

FIG. 5 conceptually illustrates an example electronic system 500 with which some implementations of the subject technology are implemented. For example, any of computing devices 110a-c of FIGS. 1 and 2 or computing system 130 of FIG. 1, as described above, may be implemented using electronic system 500. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for varying location accuracy in accordance with some implementations. From these various memory units, processing unit(s) 512 retrieves instructions to execute and data to process in order to execute the processes of some implementations (e.g., the steps of method 400 of FIG. 4, as described above).

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touch-screen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method comprising:
   determining, using one or more processor-based devices, a current map view of a digital map being displayed at a first mobile device of a first user, the displayed digital map including a visual representation indicating a geographic location of a second mobile device of a second user on the digital map, wherein the current map view includes a zoom level of the current map view displayed at the first mobile device;
   determining, using the one or more processor-based devices, a current geographic location of the first mobile device;
   initiating a network request for an updated geographic location of the second mobile device based on the determined current map view and the determined current geographic location of the first mobile device relative to the geographic location of the second mobile device, using the one or more processor-based devices, the network request specifying a degree of location accuracy for the updated geographic location of the second mobile device based on the determined current map view and the determined current geographic location of the first mobile device relative to the geographic location of the second mobile device; and
   upon receiving the updated geographic location of the second mobile device based on the initiated network request, updating the displayed visual representation for the second mobile device in the map view, using the one or more processor-based devices, based on the updated geographic location of the second mobile device.

2. The method of claim 1, wherein the initiating step further comprises:
   determining, using the one or more processor-based devices, an accuracy radius for the updated geographic location of the second mobile device based on the determined current map view and the determined current geographic location of the first mobile device relative to the geographic location of the second mobile device, the accuracy radius defining the degree of location accuracy for the updated geographic location of the second mobile device.

3. The method of claim 1, wherein the updated geographic location of the second mobile device is derived from location information captured by a GPS receiver of the second mobile device.

4. The method of claim 1, wherein the updated geographic location of the second mobile device is based on location information from a cellular communications provider.

5. The method of claim 1, wherein the updated geographic location of the second mobile device is based on location information from a WiFi network access point.

6. The method of claim 1, wherein the network request for the updated geographic location of the second mobile device is initiated on a periodic basis according to a predetermined location update frequency, and the location update frequency is adjusted based on a proximity of the geographic location of the second mobile device relative to the current geographic location of the first mobile device.

7. The method of claim 6, wherein the location update frequency is further adjusted based on motion detected by an accelerometer of the first mobile device.

8. The method of claim 1, further comprising:
   varying the degree of location accuracy for the updated geographic location of the second mobile device based on one or more threshold limitations configured by the first user.

9. The method of claim 8, wherein the one or more threshold limitations include a time of day limitation and a limitation related to a geographic area of interest displayed in the current map view.

10. A machine-readable medium comprising instructions stored therein, which when executed by a processor, causes the processor to perform operations comprising:
    determining a current map view of a digital map being displayed at a first mobile device of a first user, the displayed digital map including a visual representation indicating a geographic location of a second mobile device of a second user on the digital map, wherein the current map view includes a zoom level of the current map view displayed at the first mobile device;

determining a current geographic location of the first mobile device;

determining an accuracy radius for an updated geographic location of the second mobile device based on the determined current map view and the determined current geographic location of the first mobile device relative to the geographic location of the second mobile device, the accuracy radius defining a degree of location accuracy for the updated geographic location of the second mobile device;

initiating a network request for the updated geographic location of the second mobile device based on the determined accuracy radius, the network request specifying the degree of location accuracy for the updated geographic location of the second mobile device; and upon receiving the updated geographic location of the second mobile device based on the initiated network request, updating the displayed visual representation for the second mobile device in the map view based on the updated geographic location of the second mobile device.

11. The machine-readable medium of claim 10, wherein the updated geographic location of the second mobile device is derived from location information captured by a GPS receiver of the second mobile device.

12. The machine-readable medium of claim 10, wherein the updated geographic location of the second mobile device is based on location information from a cellular communications provider.

13. The machine-readable medium of claim 10, wherein the updated geographic location of the second mobile device is based on location information from a WiFi network access point.

14. The machine-readable medium of claim 10, wherein the network request for the updated geographic location of the second mobile device is initiated on a periodic basis according to a predetermined location update frequency, and the location update frequency is adjusted based on a proximity of the geographic location of the second mobile device relative to the current geographic location of the first mobile device.

15. The machine-readable medium of claim 14, wherein the location update frequency is further adjusted based on motion detected by an accelerometer of the first mobile device.

16. The machine-readable medium of claim 10, the operations further comprising:

varying the degree of location accuracy for the updated geographic location of the second mobile device based on one or more threshold limitations configured by the first user.

17. The machine-readable medium of claim 16, wherein the one or more threshold limitations include a time of day limitation and a limitation related to a geographic area of interest displayed in the current map view.

18. A system, comprising:

a map viewer to display a digital map according to a current map view at a first mobile device of a first user, the displayed digital map including a visual representation indicating a geographic location of a second mobile device of a second user on the digital map, and to update the displayed visual representation for the second mobile device in the map view based on an updated geographic location of the second mobile device; and a location manager to:

determine a current geographic location of the first mobile device;

determine an accuracy radius for the updated geographic location of the second mobile device based on the current map view of the map displayed by the map viewer and the determined current geographic location of the first mobile device relative to the geographic location of the second mobile device, the accuracy radius defining a degree of location accuracy for the updated geographic location of the second mobile device;

vary the degree of location accuracy for the updated geographic location of the second mobile device based on a portion of the digital map being displayed within the current map view at the first mobile device; and initiate a network request for the updated geographic location of the second mobile device based on the determined accuracy radius, the network request specifying the degree of location accuracy for the updated geographic location of the second mobile device, wherein the updated geographic location of the second mobile device is requested on a periodic basis according to a predetermined location update frequency, and the predetermined location update frequency is adjusted based on a proximity of the geographic location of the second mobile device relative to the current geographic location of the first mobile device.

* * * * *